United States Patent

Ogawa

(10) Patent No.: US 7,844,382 B2
(45) Date of Patent: Nov. 30, 2010

(54) DRIVING FORCE CONTROL APPARATUS AND METHOD FOR VEHICLE

(75) Inventor: Hiroyuki Ogawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1141 days.

(21) Appl. No.: 11/504,615

(22) Filed: Aug. 16, 2006

(65) Prior Publication Data

US 2007/0043496 A1 Feb. 22, 2007

(30) Foreign Application Priority Data

Aug. 22, 2005 (JP) ............................. 2005-240216

(51) Int. Cl.
*G06F 17/00* (2006.01)
(52) U.S. Cl. .......................................... 701/53; 701/51
(58) Field of Classification Search .................. 701/51, 701/53, 67–69; 477/34–37, 39, 107, 110, 477/115
See application file for complete search history.

(56) References Cited

U.S. PATENT DOCUMENTS

| 4,903,936 A | * | 2/1990 | Kajiwara | ..................... 251/14 |
| 6,432,025 B1 | | 8/2002 | Kondo et al. | |
| 6,842,682 B2 | * | 1/2005 | Wakao et al. | .................. 701/69 |

FOREIGN PATENT DOCUMENTS

| DE | 29 35 916 C2 | 4/1981 |
| JP | 5-44510 | 2/1993 |
| JP | 2000-104575 | 4/2000 |
| JP | 2002-87117 | 3/2002 |
| JP | 2005-22486 | 1/2005 |

* cited by examiner

*Primary Examiner*—Yonel Beaulieu
(74) *Attorney, Agent, or Firm*—Oblon, Spivak, McClelland, Maier & Neustadt, L.L.P.

(57) ABSTRACT

A driving force control apparatus includes a driver model that is a functional block adjusting characteristics relevant to human senses, and a powertrain manager that is a functional block adjusting hardware characteristics of a vehicle. The driver model includes a target base driving force calculation unit (static characteristics) using a base driving force map for example for calculating a target driving force from an accelerator pedal position, an OWC disengagement-to-synchronism dead time calculation unit, and a target transient characteristics addition unit using transient characteristics represented by a transfer function including a dead time to calculate a final target driving force from the target driving force. The target transient characteristics addition unit sets the dead time in the transient characteristics represented by "second-order lag system+dead time" based on the time required for a one-way clutch to change to the synchronous state.

16 Claims, 5 Drawing Sheets

DRIVING FORCE CONTROL APPARATUS AND METHOD FOR VEHICLE

This nonprovisional application is based on Japanese Patent Application No. 2005-240216 filed with the Japan Patent Office on Aug. 22, 2005, the entire contents of which are hereby incorporated by reference.

BACKGROUND OF THE INVENTION

1. Field of the Invention

The present invention relates to a control apparatus and a control method for a vehicle on which mounted a powertrain that includes an engine and an automatic transmission. In particular, the invention relates to a driving force control apparatus and a driving force control method with which a driving force corresponding to a driving force requested by a driver can be output.

2. Description of the Background Art

To a vehicle having an engine and an automatic transmission with which an engine output torque can be controlled independently of operation of the accelerator pedal by a driver, the concept "driving force control" may be applied. According to this concept, positive and negative target driving torques, which are calculated based on for example the degree to which the accelerator pedal is operated by the driver and operating conditions of the vehicle, are accomplished by using the engine torque and the gear ratio of the automatic transmission. Such control methods as those called "driving force request type" and "driving force demand type" are also classified into the above-described concept.

With this driving force control, a target driving torque can be determined to easily change dynamic characteristics of the vehicle. Under acceleration/deceleration (transient response), however, not only an inertia torque relevant to a change of the gear ratio of the automatic transmission with respect to time but also an inertia torque relevant to a change of the wheel speed with respect to time causes the driving torque to deviate from the target value. Thus, the torque has to be corrected.

Further, in the case where how the gear ratio should be changed is determined based on a transmission map using the throttle opening position and the vehicle speed, the following problems arise. If the driving source of the vehicle is an engine, a generated torque is increased as the throttle is opened to an increased degree. Therefore, in the case where the driver operates the vehicle to increase the requested driving force, the driving force can be increased in principle by increasing the degree to which the throttle is opened. However, the resultant characteristics are as follows. When the throttle is opened to a certain degree, the driving force generated from the engine is saturated, which means that even if the throttle is opened to a greater degree, the driving force is changed to only a small degree (driving force is not increased) (namely means that the characteristics are not linear but nonlinear). Therefore, in the state where a relatively great driving force is generated from the engine, if the driving force request is made to slightly increase the driving force, the throttle opening position is changed to a large degree. Thus, the throttle opening position is changed to a large degree so that the gear ratio is changed to cross the gear-change line on the transmission map. In this case, there is a deviation between the target driving torque and the generated torque and thus the vehicle behavior intended by the driver is not implemented.

Japanese Patent Laying-Open No. 2002-087117 discloses a driving force control apparatus using a control specification that realizes a steady-state desired value for the driving force as well as a transient-state desired value for the driving force by way of tune control of the engine torque and the gear ratio, and accordingly a driving force as requested by the driver can be achieved and the power performance and the drivability can remarkably be improved.

The driving force control apparatus disclosed in the aforementioned publication, with a powertrain including an engine and a transmission, includes means for detecting a manipulated variable of an accelerator, means for detecting a vehicle speed, desired driving force calculation means for calculating a static desired driving force based on the detected manipulated variable of the accelerator and the detected vehicle speed, driving-force pattern calculation means for calculating a desired driving-force change pattern, steady-state desired value calculation means for calculating a steady-state desired engine torque value based on the desired driving force and calculating a steady-state desired gear ratio based on the detected manipulated variable of the accelerator and the detected vehicle speed, transient-state desired value calculation means for calculating a transient-state desired engine torque value and a transient-state desired gear ratio, based on the desired driving-force change pattern, desired engine torque realization means for realizing the steady-state desired engine torque value as well as the transient-state desired engine torque value, and desired gear ratio realization means for realizing the steady-state desired gear ratio as well as the transient-state desired gear ratio.

With this driving force control apparatus, while the vehicle is running, the desired driving force calculation means calculates the static-state desired driving force based on the manipulated valuable of the accelerator detected by the accelerator manipulated variable detecting means and the vehicle speed detected by the vehicle speed detecting means, and the driving force pattern calculation means calculates the desired driving force change pattern. The steady-state desired value calculation means calculates the steady-state desired engine torque value based on the desired driving force and calculates the steady-state desired gear ratio based on the detected accelerator manipulated variable and the detected vehicle state, the transient-state desired value calculation means calculates the transient-state desired engine torque value and the transient-state desired gear ratio based on a pattern of change of the desired driving force. Then, the desired engine torque realization means realizes the steady-state desired engine torque value and the transient-state desired engine torque value, and the desired gear ratio realization means realizes the steady-state desired gear ratio and the transient-state desired gear ratio. In other words, the inertia torque generated resulting from delay in gear shift of the transmission and change in rotational speed is not entirely compensated for by the engine torque control. Instead, the control specification is provided to achieve the steady-state desired value for the driving force and the transient-state desired value for the driving force by way of tune-control of the engine torque and the gear ratio. Thus, the driving force as requested by the driver can be accomplished and the power performance and the drivability can remarkably be improved.

The driving force control apparatus disclosed in Japanese Patent Laying-Open No. 2002-087117, however, calculates the static-state desired driving force based on the accelerator manipulated variable determined by operation by the driver, and transient characteristics are calculated based on the desired driving force change pattern together with a delay occurring in each component of the vehicle, so as to determine the desired driving force. Therefore, regarding this calculation, operation by the driver and characteristics of each component of the vehicle (delay characteristics) are associated with each other. Thus, it is indispensable, for allowing perceived acceleration or deceleration to be any as desired by the driver, to stably implement transient characteristics of the acceleration of the vehicle.

The driving force control apparatus disclosed in the aforementioned publication cannot solve the following problems:

1) difficulty of adaptation based on characteristics of the driver, since operation by the driver and characteristics of each component of the vehicle (delay characteristics) are associated with each other; and 2) difficulty in implementing a desired driving force requested by the driver, because of the considerable non-linearity of such dynamic characteristics change (transient characteristics change) as delay characteristics of each vehicle component.

Moreover, the automatic transmission has, on the powertrain, a one-way clutch that prevents the engine brake from being effected in a coasting state under the condition that a predetermined gear ratio is selected. Therefore, when the vehicle having been coasting is accelerated, there is a period in which power is not transmitted, until the one-way clutch having been in a non-driven state (disengaged state) is changed to a driven state (synchronous state). The driving force control apparatus disclosed in the aforementioned publication does not take this period into account and thus appropriate characteristics of the change of a desired driving force could not be accomplished.

SUMMARY OF THE INVENTION

The present invention is made to solve the above-described problems. An object of the present invention is to provide a driving force control apparatus and a driving force control method for a vehicle that can implement a driving force requested by a driver even in the case where the vehicle has a one-way clutch and that provides satisfactory acceleration characteristics in the case where a transition is made from an accelerator-off state to an accelerator-on state.

A control apparatus according to an aspect of the present invention is a driving force control apparatus for a vehicle having a power source and a transmission connected to the power source, with a one-way clutch inserted in a powertrain including the transmission. The driving force control apparatus includes: a target driving force setting unit setting a target driving force based on operation by a driver, a transient characteristics addition unit calculating a final target driving force by adding, to the target driving force as set, transient characteristics of the target driving force, based on an operating state of the one-way clutch; and a control unit controlling the power source and the transmission based on the final target driving force as calculated.

In accordance with the present invention, the transient characteristics addition unit sets transient characteristics based on the operating state of the one-way clutch. For example, the transient characteristics are set by using a transfer function including a dead time element. At this time, if the one-way clutch has a difference in revolution number between the driving member and the driven member, the transfer function is calculated so that the dead time is longer as the difference in revolution number is larger. In this way, the fact that a larger difference in revolution number entails a longer time required for the one-way clutch to change to the synchronous state (driven state) can be compensated for. Thus, since the transient characteristics are compensated for based on the operating state of the one-way clutch, the transient characteristics can suitably be added even if acceleration is started from the state where the one-way clutch is in the non-driven state (disengaged state). Accordingly, the driving force control apparatus for the vehicle can be provided, with which a driving force requested by the driver can be achieved even if the vehicle has the one-way clutch, and satisfactory acceleration characteristics are exhibited in the case where a transition is made from the accelerator-off state to the accelerator-on state.

Preferably, the driving force control apparatus further includes a calculation unit calculating, when the one-way clutch is in a non-driven state, a required time that is required for the non-driven state to change to a driven state. The transient characteristics addition unit calculates the final target driving force by adding transient characteristics of the target driving force, based on a parameter that is set based on the required time.

In accordance with the present invention, the time required for the one-way clutch to change from the non-driven state to the driven state is set for example as a dead time. Thus, since the transient characteristics are compensated for based on the operating state of the one-way clutch, the transient characteristics can suitably be added even when the acceleration is started from the state where the one-way clutch is in the non-driven state (disengaged state).

Still preferably, the transient characteristics are second-order lag characteristics including a dead time characteristic having a dead time as a parameter.

In accordance with the present invention, for example, the time required for the one-way clutch to change from the non-driven state to the driven state is set as a dead time. Therefore, even when the acceleration is started from the state where the one-way clutch is in the non-driven state (disengaged state), the transient characteristics can suitably be added.

Still preferably, the driving force control apparatus further includes a calculation unit calculating, when the one-way clutch is in a non-driven state, a required time that is required for the non-driven state to change to a driven state. The transient characteristics addition unit sets the dead time based on the required time and calculates the final target driving force by adding transient characteristics of the target driving force.

In accordance with the present invention, the time required for the one-way clutch to change from the non-driven state to the driven state is set as a dead time. Therefore, even when the acceleration is started from the state where the one-way clutch is in the non-driven state (disengaged state), the transient characteristics can suitably be added.

Still preferably, the control unit includes a first torque calculation unit calculating a target torque of the power source when the one-way clutch is in a driven state, a second torque calculation unit calculating a target torque of the power source when the one-way clutch is in a non-driven state, and a selection unit selecting one of the first torque calculation unit and the second torque calculation unit based on a state of the one-way clutch.

In accordance with the present invention, depending on the state of the one-way clutch, switch is made between the first torque calculation unit and the second torque calculation unit (both torque calculation units are powertrain managers). When the one-way clutch is in the non-driven state (disengaged state), the second torque calculation unit is used to calculate a requested engine torque so that a shock that could occur when the one-way clutch changes from the non-driven state (disengaged state) to the driven (synchronous state) is reduced. If the first torque calculation unit is used even in the case where the one-way clutch is in the non-driven state (disengaged state), a shock could occur when synchronism of the one-way clutch is established and the target driving force determined by the target driving force setting unit could not be achieved. Thus, when the one-way clutch is in the non-driven state, switch is made to the second torque calculation unit to calculate the requested engine torque. Thus, the shock that could occur when synchronism of the one-way clutch is established can be avoided and accordingly the state where the target driving force determined by the target driving force setting unit could not be achieved can also be avoided. Accordingly, the driving force control apparatus for the vehicle can be provided, with which a driving force requested by the driver can be achieved and satisfactory acceleration characteristics are exhibited in the case where a transition is made from the accelerator-off state to the accelerator-on state, even if the vehicle has the one-way clutch.

Still preferably, the power source is an internal combustion engine, and the control unit controls a target throttle opening position of the internal combustion engine.

In accordance with the present invention, in the case where the one-way clutch is in the non-driven state and the transient characteristics are compensated for by the dead time and where a higher priority is given to a request of the driver (for example, in the case where the sport mode is selected in which the internal combustion engine immediately increases the torque in response to the operation of depressing the accelerator pedal), the rise of the torque of the internal combustion engine would be delayed relative to operation of the accelerator, if the second torque calculation unit calculates the requested engine torque, the transient response is compensated for by adding the dead time element, the requested engine torque is output to the internal combustion engine and the target throttle opening position is calculated. In such a case, the requested throttle opening position of the internal combustion engine is directly calculated. Accordingly, the processing time can be shortened and the response of the rise of the torque of the internal combustion engine relative to the driver's request can be improved.

A control apparatus according to another aspect of the present invention includes a target driving force setting unit setting a target driving force based on operation by a driver, and a control unit controlling the power source based on the target driving force as set. The control unit includes a first torque calculation unit calculating a target torque of the power source when the one-way clutch is in a driven state, a second torque calculation unit calculating a target torque of the power source when the one-way clutch is in a non-driven state, and a selection unit selecting one of the first torque calculation unit and the second torque calculation unit based on a state of the one-way clutch.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
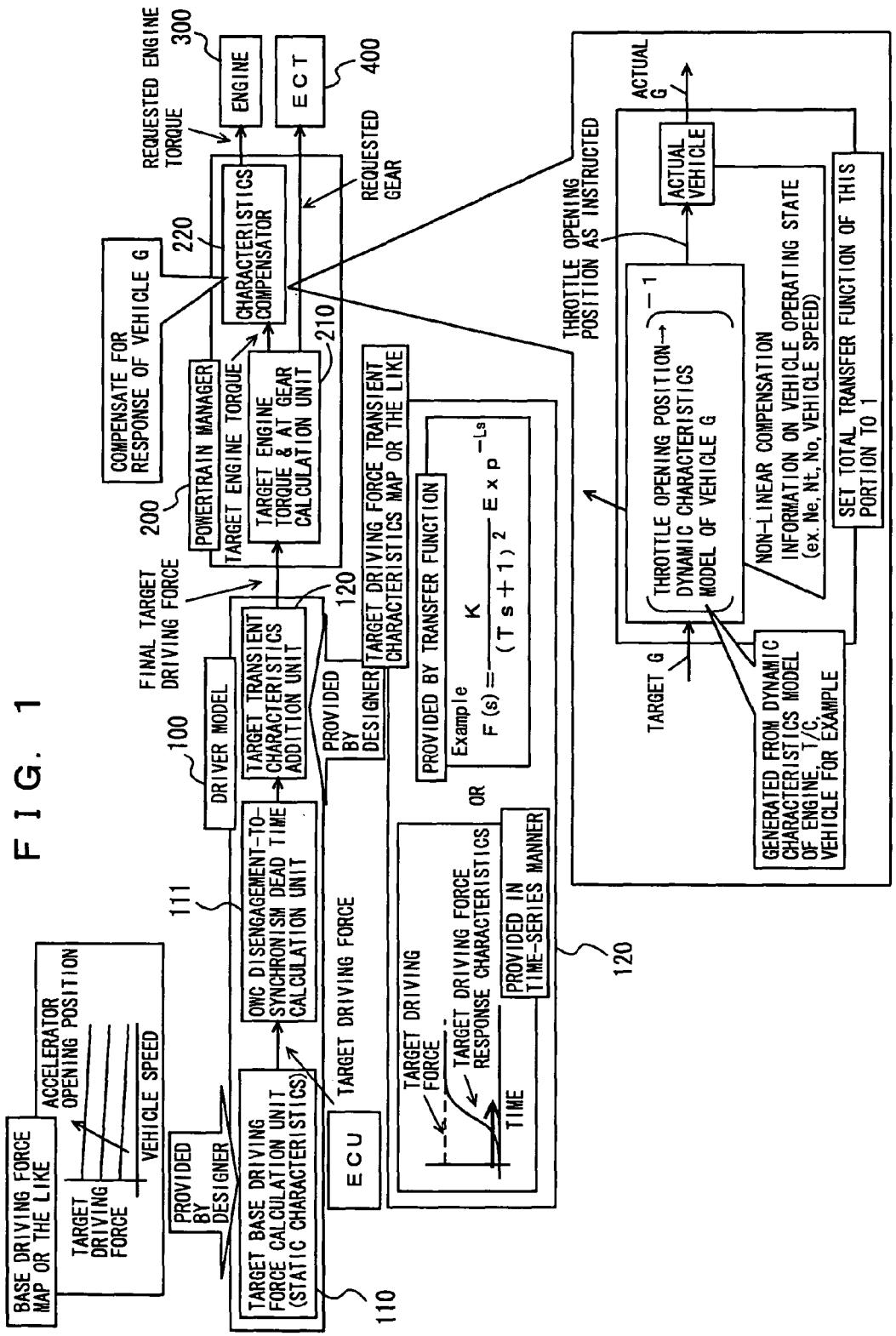
FIG. 1 is a block diagram showing the entire configuration of a control apparatus according to a first embodiment of the present invention.

With reference to the drawings, embodiments of the present invention are hereinafter described. In the following description, like components are denoted by like reference characters. The like components are named similarly and function similarly. Therefore, a detailed description thereof is not repeated.

FIG. 1 shows a control block diagram of a driving force control apparatus according to the present embodiment. This driving force control apparatus is implemented by a program executed by a CPU (Central Processing Unit) included in an ECU (Electronic Control Unit) mounted on a vehicle.

As shown in FIG. 1, the driving force control apparatus finally outputs a requested engine torque to an engine 300 and outputs a requested gear to an ECT (Electronically Controlled automatic Transmission) 400. It is noted that ECT 400 may be a belt-type CVT (Continuously Variable Transmission). In this case, the output is not the requested gear but a requested gear ratio.

With reference to FIG. 1, a configuration of the driving force control apparatus of the present embodiment is now described in detail. It is noted that the specific map, transfer function, coefficients and parameters as described below are exemplary ones and the present invention is not limited to them.

This driving force control apparatus includes a driver model 100 and a powertrain manager 200. By a target transient characteristics addition unit 120 included in driver model 100, tuning is performed in terms of human senses, not in terms of hardware characteristics of the vehicle. By a characteristics compensator 220 included in powertrain manager 200, tuning is performed in terms of vehicle hardware characteristics, not in terms of human senses. Accordingly, human senses and vehicle hardware characteristics are processed separately. Further, tuning of transient characteristics due to non-linearity of hardware characteristics of the vehicle is facilitated. Concerning the driving force control apparatus, driver model 100 and powertrain manager 200 are now described in this order.

As shown in FIG. 1, driver model 100 includes a target base driving force calculation unit (static characteristics) 110, an OWC (one-way clutch) disengagement-to-synchronism dead time calculation unit 111, namely the unit of calculating a dead time of transition from a disengaged (non-driven) state to a synchronous (driven) state of the OWC, and target transient characteristics addition unit 120 calculating a final target driving force based on a target driving force that is output from target base driving force calculation unit (static characteristics) 110.

OWC disengagement-to-synchronism dead time calculation unit 111 calculates, in the case where the number of revolutions (hereinafter revolution number) of a driven member of the one-way clutch, Nin, is smaller than that of a driving member, Nout, a dead time L of a transfer function of target transient characteristics addition unit 120, by using the difference in revolution number $Nd = Nout - Nin$. At this time, the dead time L is calculated from f (Nd, x) (where x is such a parameter as vehicle speed or acceleration). It is noted that, there is a tendency that, as the difference in revolution number Nd is larger, the dead time L is longer.

Target base driving force calculation unit (static characteristics) 110 calculates a target driving force based on a map with which the target driving force is determined by a vehicle speed with respect to an accelerator opening position used as a parameter, as shown in "base driving force map or the like" in FIG. 1. In other words, target base driving force calculation unit (static characteristics) 110 calculates the target driving force from the accelerator opening position determined by operation by the driver and the speed of the vehicle (vehicle speed) at this time.

Target transient characteristics addition unit 120 is a unit performing a computation for determining what transient characteristics are to be provided, in terms of human senses (separately from hardware characteristics of the vehicle). Target transient characteristics addition unit 120 is provided in the time-series manner or in the form of a transfer function F(s) (second-order lag+dead time) as shown for example in "target driving force transient characteristics map or the like" in FIG. 1. Since target transient characteristics addition unit 120 is provided in the time-series manner or in the form of the transfer function as described above, (on the precondition that a characteristics compensator 220 described hereinlater operates normally,) a target response in the target driving force transient characteristics map can be adjusted to tune (customize) vehicle acceleration characteristics (static characteristics and dynamic characteristics) with respect to the accelerator opening position, without depending on hardware characteristics of the vehicle. In the following, a description is given of the case where "target driving force transient characteristics map or the like" is provided in the form of a transfer function.

Target transient characteristics addition unit 120 uses, as shown in FIG. 1, the transfer function $F(s)=K/(Ts+1)^2 \cdot Exp^{-Ls}$. Here, the parameter L (dead time) is calculated by OWC disengagement-to-synchronism dead time calculation unit 111 as described above. Further, the parameter T is a period that represents a response speed. As the parameter T is smaller, a gradient representing an increase of the driving force with transient characteristics is larger (steeper). In contrast, as the parameter T is larger, the gradient representing the increase of the driving force is smaller (gentler).

Thus, since the transfer function F(s) includes the dead time element, when there is the differential in revolution number Nd of the one-way clutch, the transfer function including the dead time L adds a transient response. At this time, the transfer function is calculated in such a manner that, as the difference in revolution number Nd of the one-way clutch is larger, the dead time L is longer, for the following reason. As the difference in revolution number Nd is larger, a longer time is necessary for the one-way clutch to enter the synchronism (driven) state.

Figure 2:
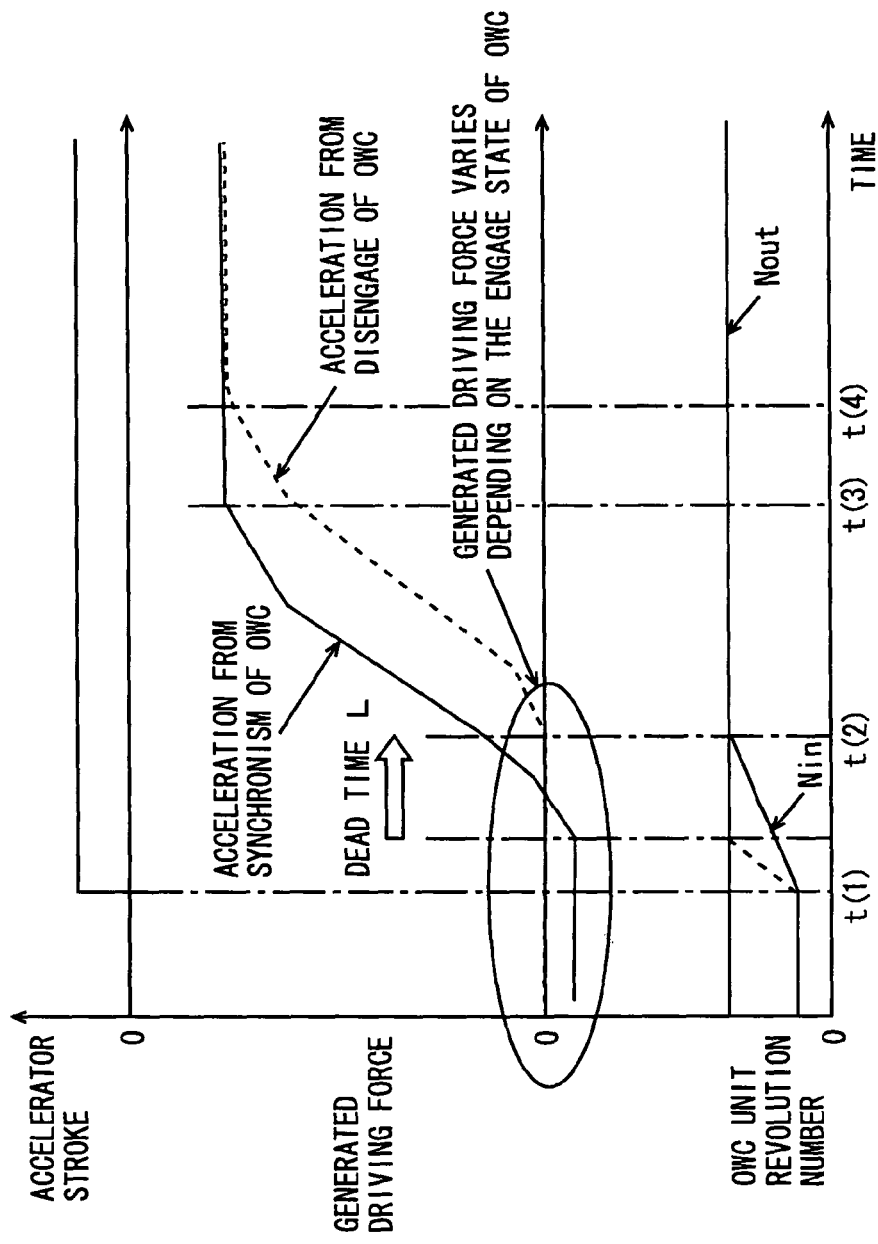
FIG. 2 is a timing chart illustrating an operation of a vehicle on which mounted the control apparatus according to the first embodiment of the present invention.

The state at this time is shown in FIG. 2. It is supposed here that the accelerator pedal is depressed at the time t (1) in FIG. 2. The generated driving force starts increasing at the time t (1) without dead time, if the acceleration is started in the state where the one-way clutch is in the driven state (synchronous state). In contrast, if the acceleration is started in the state where the one-way clutch is in the non-driven state (disengaged state), the generated driving force starts increasing at time t (3).

Thus, in target transient characteristics addition unit 120, the dead time element can be used to suitably add the transient characteristics even in the case where the acceleration is started in the state where the one-way clutch in the non-driven state (disengaged state).

The transfer function as shown in FIG. 1 is an example comprised of the "second-order lag element+dead time element" as described above. It is supposed that a change of the target driving force is a stepwise change (for example in the case where the accelerator pedal is depressed in a stepwise manner). Then, in a time region, the transfer function provides a transient response of a second-order lag system including the dead time. In this respect, the embodiment may be regarded as the one having a filter of the second-order lag system with respect to a requested driving force.

A specific example of actual adjustment (tuning) is described. A parameter ωn and a parameter ζ in the aforementioned transfer function are tuned. From an analysis of the waveform of the step response of the transfer function, the following are seen. It is noted that the description below is applied to the case where the expression representing the transfer function is transformed by changing $K/(Ts+1)^2$ to $K \cdot \omega n/(s^2+2\zeta \omega n+\omega n^2)$.

When the parameter ζ is in the range of 0<ζ<1 (underdamped), an overshoot is generated and, as the parameter ζ is smaller, oscillation is greater. When the parameter ζ is larger than 1, namely ζ>1 (overdamped), no oscillation occurs and, as parameter ζ is larger, the target value is more gradually approached. When the parameter ζ is equal to 1, namely ζ=1 (critically damped), the target value is reached without oscillation.

Regarding the overshoot Φ in the case of 0<ζ<1 (underdamped), the following are seen. In the underdamped case, oscillation occurs with repeated overshoot and undershoot. Therefore, in actual, the parameter ζ cannot be set in the range of 0<ζ<1 (underdamped). Then, for the parameter ζ, tuning is performed based on the following principles.

In the case where the driver desires that the perceived acceleration change is smooth, or in the case where tuning appropriate for the family car and the like which is a concept of the vehicle is desired, the parameter ζ (>1) is adjusted to be larger. Namely, a gradual rise is implemented like the one implemented by ζ=2.0 or ζ=4.0 for example.

In contrast, in the case where the driver desires that the perceived acceleration change is direct, or in the case where tuning appropriate for the sporty car and the like which is a concept of the vehicle is desired, the parameter ζ is adjusted to a value that is as close as possible to 1 while larger than 1, namely to a value close to 1 with the limit of ζ=1.0. A quick rise can be implemented like the one implemented by ζ=1.0.

Next, tuning of the parameter ωn is described. In the step response of the second-order lag system, the parameter ωn influences the shape of the response curve extending to the inflection point. In the case where the parameter ζ is 1, as parameter ωn is increased, the aforementioned shape of the response curve immediately becomes linear. As the parameter ωn is decreased, the shape of the response curve becomes gradually (initially rounded) linear. Accordingly, the parameter ωn is tuned based on the following principles.

In the case where the driver desires that the perceived acceleration change is smooth, or in the case where tuning appropriate for the family car and the like which is a concept of the vehicle is desired, the parameter ωn is adjusted to be smaller. In other words, a gradual rise with a rounded portion near the inflection point is implemented.

In contrast, in the case where the driver desires that the perceived acceleration change is direct, or in the case where tuning appropriate for the sporty car and the like which is a concept of the vehicle is desired, the parameter ωn is adjusted to be larger. In other words, a quick rise without rounded portion near the inflection point is implemented.

Thus, in the case where the driver desires that the perceived acceleration change is smooth, or in the case where tuning appropriate for the family car and the like which is a concept of the vehicle is desired, the parameter $\zeta$ (>1) is adjusted to be larger while the parameter $\omega n$ is adjusted to be smaller. In the case where the driver desires that the perceived acceleration change is direct, or in the case where tuning appropriate for the sporty car and the like which is a concept of the vehicle is desired, the parameter $\zeta$ (>1) is adjusted to be as close as possible to 1 while the parameter $\omega n$ is adjusted to be larger. It is noted that these parameters and the method of adjusting the parameters are exemplary ones, and the present invention is not limited to them.

As discussed above, by using the transfer function as shown in FIG. 1 to provide target driving force transient characteristics, a designer can easily implement tuning that can readily be adapted to the senses of the driver or the concept of the vehicle. Thus, characteristics compensator 220 of powertrain manager 200 which is described hereinlater is used to configure a compensator relevant to hardware characteristics (particularly non-linear characteristics) of the vehicle, while driver model 100 can adjust only those factors that influence the human senses and that do not influence such hardware characteristics of the vehicle as described above, separately from the hardware characteristics of the vehicle.

Powertrain manager 200 includes a target engine torque & AT gear calculation unit 210, and characteristics compensator 220 calculating a requested engine torque based on a target engine torque that is output from target engine torque & AT gear calculation unit 210. Characteristics compensator 220 compensates for an element that is response of a vehicle G, namely acceleration generating in the vehicle, and that depends on hardware characteristics of the vehicle.

Characteristics compensator 220 is an arbitrary component according to the present invention, and is designed based on an inverse function of a transfer function from the engine throttle opening position to the vehicle acceleration determined by identifying an actual vehicle or a detailed simulation model for an element that is hardware characteristics of the vehicle and that exhibits a particularly marked non-linearity, separately from human senses. With this structure, accelerator opening position—vehicle acceleration characteristics (static characteristics, dynamic characteristics) can be kept constant without considerably influenced by hardware characteristics of the vehicle. Thus, in combination with target transient characteristics addition unit 120 as described above, highly satisfactory acceleration characteristics can be provided to the user.

A requested gear that is output from target engine torque & AT gear calculation 210 is input to ECT 400 to control an oil hydraulic circuit of the transmission and thereby implement the requested gear by the transmission.

Further, as shorn in FIG. 1, characteristics compensator 220 is designed to provide a total transfer function G(s) from a target G (target engine torque) to an actual G (requested engine torque) (including the inverse function of the dynamic-characteristics model of throttle opening position→vehicle G) as "G(s)=1." Thus, in a high-frequency region as well (in the case where the accelerator opening position is suddenly changed), satisfactory response can be maintained. It is noted that the dynamic-characteristics model of throttle opening position→vehicle G is generated based on a dynamic-characteristics model of an engine, a torque converter and the vehicle.

It is noted that, regarding this total transfer function G(s), the operating region may be divided into a plurality of regions and partial linearization may be provided in each region for example, so as to allow an inverse function of the dynamic-characteristics model of throttle opening position→vehicle G to be calculated. Further, characteristics compensator 220 may change or switch characteristics according to vehicle operating-state information (engine speed Ne, turbine revolution number Nt, output shaft revolution number No, vehicle speed). Thus, an effect of changing the dynamic characteristics model itself is obtained.

As shown in FIG. 1, target transient characteristics addition unit 120 is provided to precede powertrain manager 200 and this powertrain manager 200 is provided as a functional block separate from target transient characteristics addition unit 120. Target transient characteristics addition unit 120 is configured as a functional block that processes only an element relevant to human senses, while powertrain manager 200 is configured to process only an element depending on hardware characteristics of the vehicle.

In this way, the driving force control apparatus of the present embodiment is configured to separately have a functional block that influences human senses or senses relevant to the concept of the vehicle (target transient characteristics addition unit) and a functional block that influences hardware characteristics of the vehicle (characteristics compensator). The target transient characteristics addition unit represents the transfer function from a target driving force to a final target driving force by a transfer function that can easily be tuned by a designer by means of senses, for example, a transfer function of a second-order lag system. Thus, it is facilitated to adjust transient characteristics in a time region such as rise characteristics for example starting from stepwise depression of the accelerator pedal. The characteristics compensator defines, the total transfer function G(s) including an inverse function of the dynamic-characteristics model from the throttle opening to the vehicle G, as G(s)=1. Accordingly, the requested engine torque can be calculated from the target engine torque while the non-linearity is eliminated. Consequently, a designer can easily perform tuning in terms of human senses and hardware characteristics can be compensated for regardless of hardware characteristics of the vehicle having non-linear control characteristics.

In particular, according to the present embodiment, OWC disengagement-to-synchronism dead time calculation unit 111 uses a difference in revolution number Nd of the one-way clutch to calculate the dead time L. In target characteristics addition unit 120, the transfer function is provided as "second-order lag element+dead time element". The dead time L calculated by OWC disengagement to synchronism-dead time calculation unit 111 is substituted for the dead time L of the dead time element of target transient characteristics addition unit 120. Thus, with the dead time element L, the transient characteristics are implemented in consideration of the time required for establishing synchronism of the one-way clutch, and shock of acceleration can be prevented from occurring.

Second Embodiment

A second embodiment of the present invention is hereinafter described. It is noted that similar functions to those of the first embodiment are denoted by similar reference characters. Therefore, the detailed description thereof is not repeated.

A driving force control apparatus according to the present embodiment does not have OWC disengagement-to-synchronism dead time calculation unit 111 but has an OWC synchronous time powertrain manager 201 and a driver-request-first processing unit 203 in parallel with powertrain manager 200. It is noted that OWC synchronous time powertrain manager 201 is a functional block that is used when the one-way clutch is in the non-driven state (disengaged state).

Figure 3:
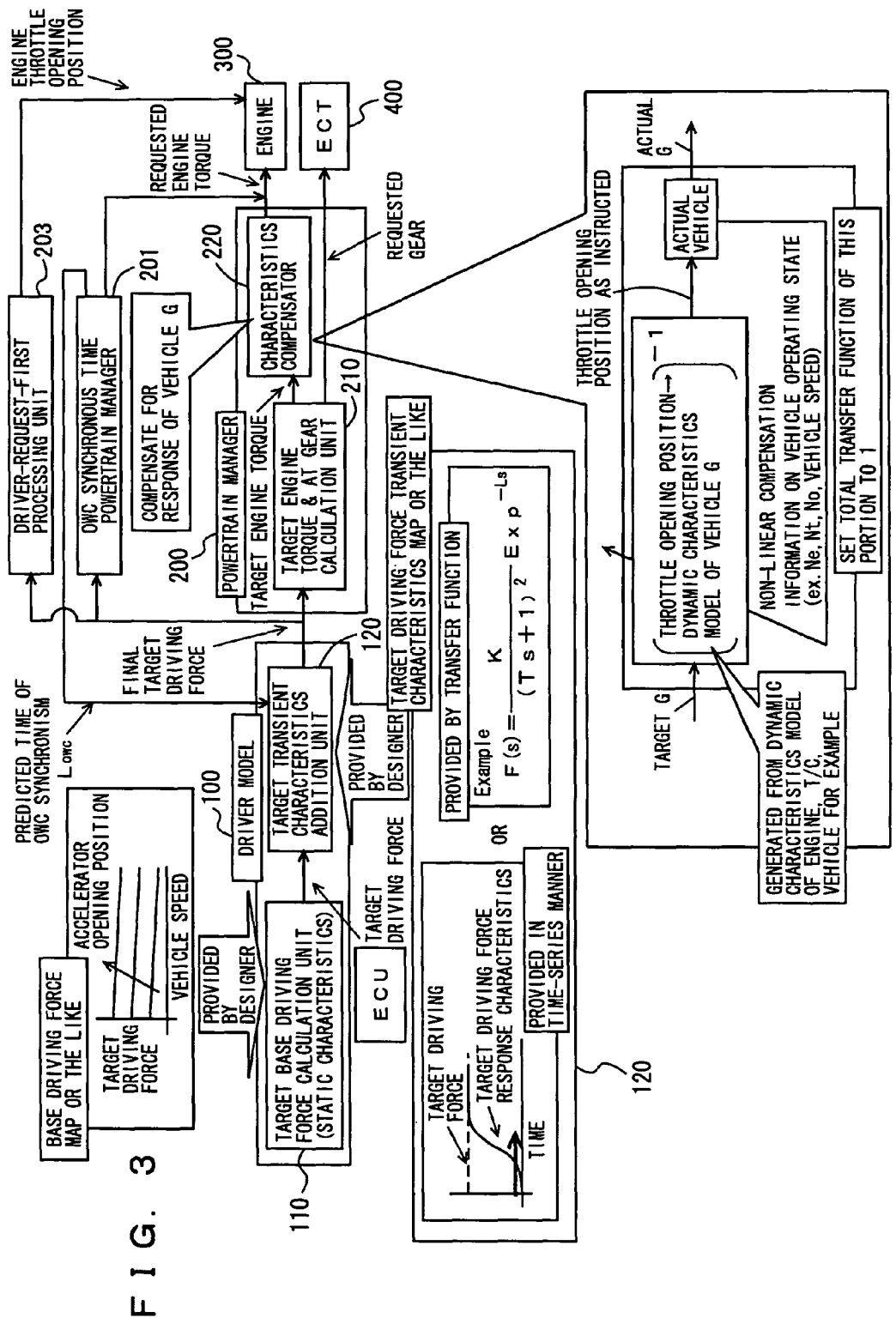
FIG. 3 is a block diagram showing the entire configuration of a control apparatus according to a second embodiment of the present invention.

As shown in FIG. 3, a final target driving force that is output from driver model 100 is output to any of powertrain manager 200, OWC synchronous time powertrain manager 201 and driver-request-first processing unit 203.

OWC synchronous time powertrain manager 201 outputs, to engine 300, a requested engine torque calculated based on the final target driving force, and outputs, to target transient characteristics addition unit 120, predicted time of OWC synchronism Lowc.

OWC synchronous time powertrain manager 201 calculates the requested engine torque from the final target driving force, using a target engine speed or rate of change of the speed, and target synchronous time for example.

Driver-request-first processing unit 203 uses the target engine speed or the rate of change of the speed and target synchronous time for example to calculate a requested engine-throttle opening position from the final target driving force and output the calculated opening position directly to engine 300 (without calculating the requested engine torque).

Figure 4:
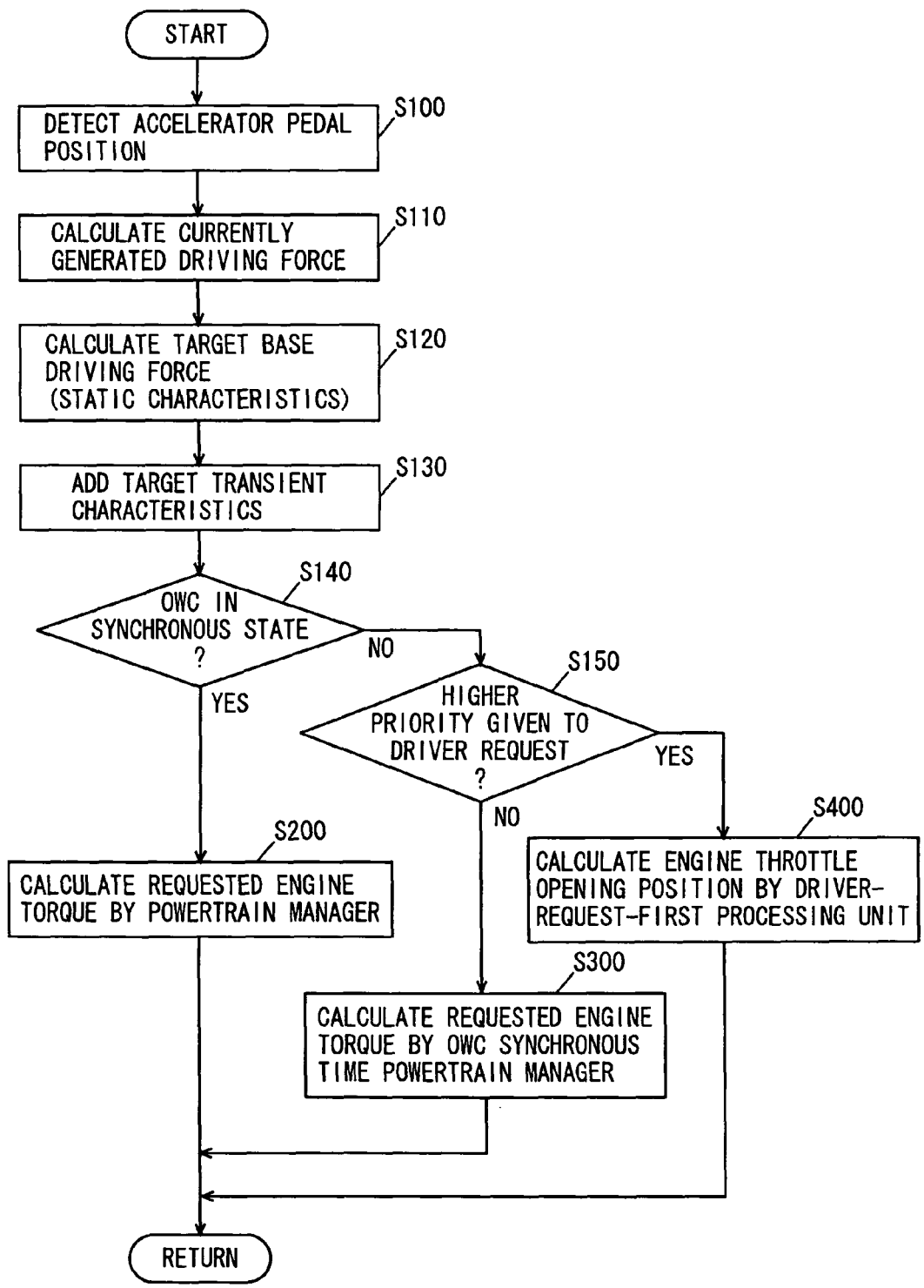
FIG. 4 is a flowchart showing a control structure of a program executed by the control apparatus according to the second embodiment of the present invention.

Referring to FIG. 4, a description is given of a control structure of a program executed by the driving force control apparatus according to the present embodiment.

In step (hereinafter abbreviated as S) 100, the driving force control apparatus detects the accelerator pedal position. In S110, the driving force control apparatus calculates a currently generated driving force based on the state (driven state/non-driven state) of the one-way clutch provided in ECT 400, the state (engaged state/slipped state/released state) of a lockup clutch, the generated engine torque, and the velocity ratio of the torque converter for example.

In S120, the driving force control apparatus (specifically target base driving force calculation unit 110) calculates a target base driving force, which corresponds to static characteristics. In S130, the driving force control apparatus (specifically target transient characteristics addition unit 120) performs an operation of adding target transient characteristics to the target base driving force, which corresponds to transient characteristics represented by "second-order lag element+dead time element" as the first embodiment described above.

In S140, the driving force control apparatus determines whether or not the one-way clutch is in the synchronous state. At this time, the driving force control apparatus determines that there is synchronism if the difference between the revolution number of the driven member, Nin, and the revolution number of the driving member, Nout, of the one-way clutch, namely the difference in revolution number Nd=Nout−Nin, is smaller than a threshold value. The determination may be made by another method. When the one-way clutch is in the synchronous state (YES in S140), the process proceeds to S200. Otherwise (NO in S140), the process proceeds to S150.

In S150, the driving force control apparatus determines whether or not a higher priority is given to processing of a driver request. For example, if a "sport drive" switch is pressed to select the sport mode, it is determined that a higher priority is given to processing of the driver request, namely the driver request is processed first. When it is determined that a higher priority is given to processing of the driver request (YES in S150), the process proceeds to S400. Otherwise (NO in S150), the process proceeds to S300.

In S200, the driving force control apparatus uses powertrain manager 200 to calculate a requested engine torque.

In S300, the driving force control apparatus uses OWC synchronous time powertrain manager 201 to calculate the requested engine torque.

In S400, the driving force control apparatus uses driver-request-first processing unit 203 to calculate a requested engine throttle opening position.

A description is now given of an operation of a vehicle on which mounted the driving force control apparatus according to the present embodiment, based on the above-described structure and flowchart.

When the driver depresses the accelerator pedal, the pedal position is detected (S100). Driver model 100 calculates a final target driving force.

When the one-way clutch is in a driven state (synchronous state) (YES in S140), powertrain manager 200 calculates a requested engine torque (S200) as in the first embodiment. At this time, the calculated dead time L is 0.

Under the conditions that the one-way clutch is in the non-driven state (disengaged state) (NO in S140) and that a higher priority is not given to the driver request (NO in S150), OWC synchronous time powertrain manager 201 calculates a requested engine torque (S200). At this time, the dead time L is calculated as a function of the difference in revolution number Nd.

Under the conditions that the one-way clutch is in the non-driven state (disengaged state) (NO in S140) and that a higher priority is given to the driver request (YES in S150), driver-request-first processing unit 203 calculates a requested engine throttle opening position (S400).

In this way, depending on the operating state of the one-way clutch, the powertrain manager is changed to calculate the requested engine torque so that a shock is reduced that could occur in transition from the non-driven state (disengaged state) to the driven state (synchronous state) of the one-way clutch. If the one-way clutch is in the non-driven state (disengaged state), transmission of the torque generated in the engine to drive wheels is not represented by a linear or transfer function. For example, if the gear of ECT 400 is the first gear and in the non-driven state, the one-way clutch is in the non-driven state (disengaged state) and accordingly the engine is disconnected from drive wheels. In this case, if powertrain manager 200 performs the control, a shock could be generated when the one-way clutch enters the synchronous state and the target driving force determined by the drive model could not be achieved. However, the present embodiment switches the powertrain manager depending on the operating state of the one-way clutch to calculate the requested engine torque. Thus, it can be avoided that a shock is generated when the one-way clutch enters the synchronous state and that the target driving force determined by the driver model cannot be achieved.

Moreover, in the case where a higher priority is given to the driver's request, the requested engine throttle opening position is directly calculated by driver-request-first processing unit 203, instead of calculating the requested engine torque by the powertrain manager to output the requested engine torque to engine 300 and thereby calculate the engine throttle opening position. Thus, the time for processing can be shortened and the response to the driver's request can be improved.

Third Embodiment

A third embodiment of the present invention is hereinafter described. It is noted that, in the following description, similar functions to those of the first embodiment or the second embodiment are denoted by like reference characters including the step numbers. Therefore, the detailed description thereof is not repeated.

A driving force control apparatus of the present embodiment has a part that executes a program different from that of the driving force control apparatus of the second embodiment.

Figure 5:
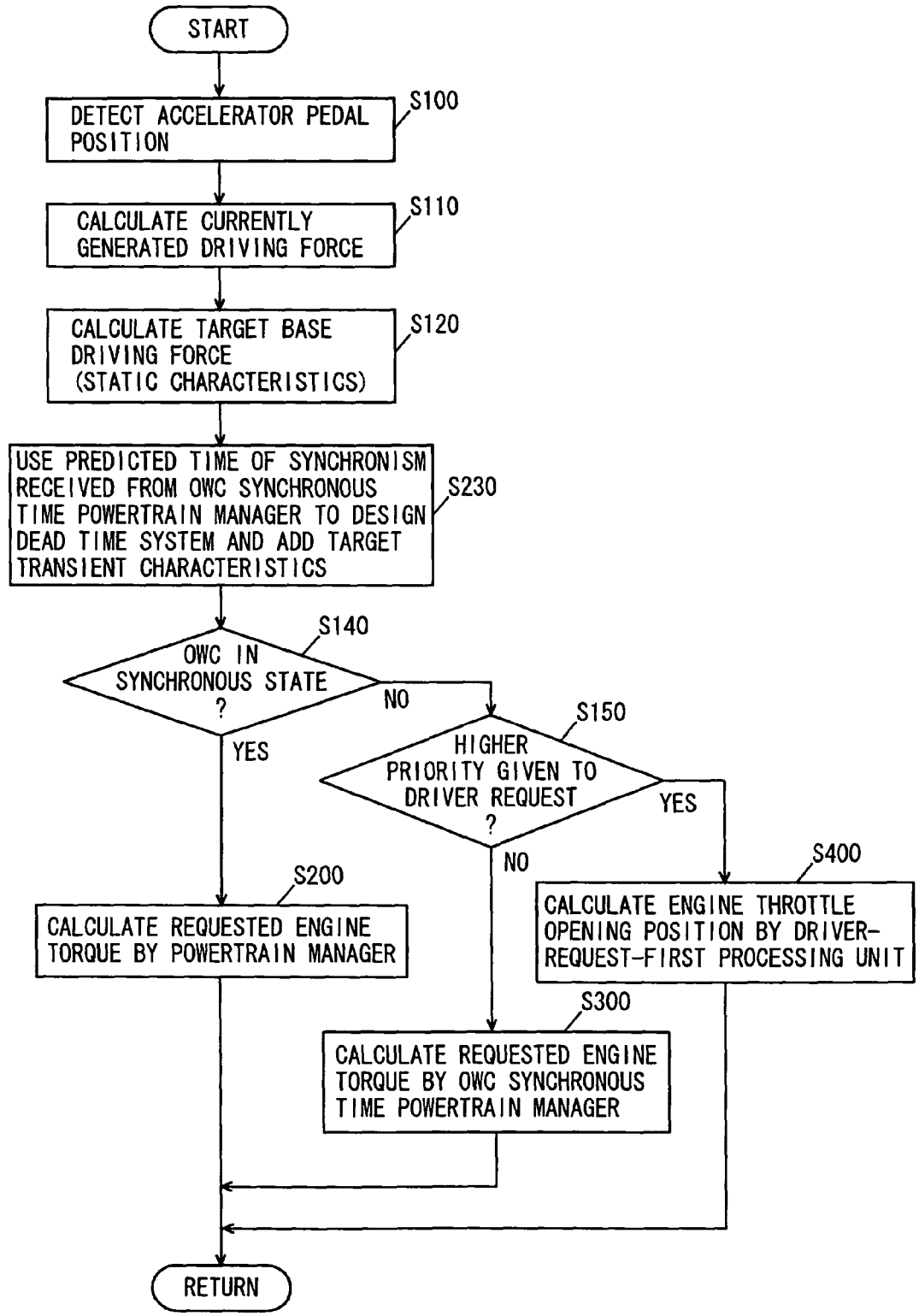
FIG. 5 is a flowchart showing a control structure of a program executed by a control apparatus according to a third embodiment of the present invention.

Referring to FIG. 5, a control structure of the program executed by the driving force control apparatus of the present embodiment is described. It is noted that, in the flowchart shown in FIG. 5, the same process steps as those of the above-described flowchart in FIG. 4 are denoted by the same step numbers. In the same process steps, the same operation is performed. Therefore, the detailed description thereof is not repeated.

In S230, the driving force control apparatus (specifically target transient characteristics addition unit 120) uses a predicted time of synchronism Lowc that is received from OWC synchronous time powertrain manager 201 to design a dead time system and perform an operation of adding target transient characteristics to the target base driving force. This is transient characteristics represented by a second-order lag element and the predicted time of synchronism Lowc as dead time element L.

As heretofore discussed, since the dead time L of the dead time element of the transient characteristics added by target transient characteristics addition unit 120 is the predicted time of synchronism Lowc of the one-way clutch, the transient characteristics is represented using the dead time element L in consideration of the time required for establishing synchronism of the one-way clutch, so that a shock of acceleration can be prevented from occurring.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A driving force control apparatus for a vehicle having a power source and a transmission connected to said power source, with a one-way clutch inserted in a powertrain including said transmission, said driving force control apparatus comprising:
   a target driving force setting unit setting a target driving force based on operation by a driver;
   a transient characteristics addition unit calculating a final target driving force by adding, to said target driving force as set, transient characteristics of said target driving force, based on an operating state of said one-way clutch;
   a control unit controlling said power source and said transmission based on said final target driving force as calculated; and
   a calculation unit calculating, when said one-way clutch is in a non-driven state, a required time that is required for the non-driven state to change to a driven state, wherein
   said transient characteristics addition unit calculates the final target driving force by adding transient characteristics of said target driving force, based on a parameter that is set based on said required time.

2. A driving force control apparatus for a vehicle having a power source and a transmission connected to said power source, with a one-way clutch inserted in a powertrain including said transmission, said driving force control apparatus comprising:
   a target driving force setting unit setting a target driving force based on operation by a driver;
   a transient characteristics addition unit calculating a final target driving force by adding, to said target driving force as set, transient characteristics of said target driving force, based on an operating state of said one-way clutch; and
   a control unit controlling said power source and said transmission based on said final target driving force as calculated, wherein
   said transient characteristics are second-order lag characteristics including a dead time characteristic having a dead time as a parameter.

3. The driving force control apparatus for the vehicle according to claim 2, wherein
   said driving force control apparatus further comprises a calculation unit calculating, when said one-way clutch is in a non-driven state, a required time that is required for the non-driven state to change to a driven state, and
   said transient characteristics addition unit sets said dead time based on said required time and calculates the final target driving force by adding transient characteristics of said target driving force.

4. A driving force control apparatus for a vehicle having a power source and a transmission connected to said power source, with a one-way clutch inserted in a powertrain including said transmission, said driving force control apparatus comprising:
   a target driving force setting unit setting a target driving force based on operation by a driver;
   a transient characteristics addition unit calculating a final target driving force by adding, to said target driving force as set, transient characteristics of said target driving force, based on an operating state of said one-way clutch; and
   a control unit controlling said power source and said transmission based on said final target driving force as calculated, wherein said control unit includes
      a first torque calculation unit calculating a target torque of said power source when said one-way clutch is in a driven state,
      a second torque calculation unit calculating a target torque of said power source when said one-way clutch is in a non-driven state, and
      a selection unit selecting one of said first torque calculation unit and said second torque calculation unit based on a state of said one-way clutch.

5. The driving force control apparatus for the vehicle according to claim 4, wherein
   said power source is an internal combustion engine, and
   said control unit controls a throttle opening position of said internal combustion engine.

6. A driving force control apparatus for a vehicle having a power source and a transmission connected to said power source, with a one-way clutch inserted in a powertrain including said transmission, said driving force control apparatus comprising:
   a target driving force setting unit setting a target driving force based on operation by a driver; and
   a control unit controlling said power source based on said target driving force as set,
   said control unit including
   a first torque calculation unit calculating a target torque of said power source when said one-way clutch is in a driven state,
   a second torque calculation unit calculating a target torque of said power source when said one-way clutch is in a non-driven state, and a selection unit selecting one of said first torque calculation unit and said second torque calculation unit based on a state of said one-way clutch.

7. The driving force control apparatus according to claim 6, wherein
said power source is an internal combustion engine, and
said control unit controls a throttle opening position of said internal combustion engine.

8. A driving force control apparatus for a vehicle having a power source and a transmission connected to said power source, with a one-way clutch inserted in a powertrain including said transmission, said driving force control apparatus comprising:
means for setting a target driving force based on operation by a driver;
means for calculating a final target driving force by adding, to said target driving force as set, transient characteristics of said target driving force, based on an operating state of said one-way clutch;
means for controlling said power source and said transmission based on said final target driving force as calculated; and
means for calculating, when said one-way clutch is in a non-driven state, a required time that is required for the non-driven state to change to a driven state,
wherein said means for calculating the final target driving force includes means for calculating the final target driving force by adding transient characteristics of said target driving force, based on a parameter that is set based on said required time.

9. A driving force control apparatus for a vehicle having a power source and a transmission connected to said power source, with a one-way clutch inserted in a powertrain including said transmission, said driving force control apparatus comprising:
means for setting a target driving force based on operation by a driver;
means for calculating a final target driving force by adding, to said target driving force as set, transient characteristics of said target driving force, based on an operating state of said one-way clutch; and
means for controlling said power source and said transmission based on said final target driving force as calculated,
wherein said transient characteristics are second-order lag characteristics including a dead time characteristic having a dead time as a parameter.

10. The driving force control apparatus for the vehicle according to claim 9, further comprising:
means for calculating, when said one-way clutch is in a non-driven state, a required time that is required for the non-driven state to change to a driven state, and
wherein means for calculating a final target driving force includes means for setting said dead time based on said required time and calculating the final target driving force by adding transient characteristics of said target driving force.

11. A driving force control apparatus for a vehicle having a power source and a transmission connected to said power source, with a one-way clutch inserted in a powertrain including said transmission, said driving force control apparatus comprising:
means for setting a target driving force based on operation by a driver;
means for calculating a final target driving force by adding, to said target driving force as set, transient characteristics of said target driving force, based on an operating state of said one-way clutch; and
means for controlling said power source and said transmission based on said final target driving force as calculated,
wherein said means for controlling said power source and said transmission includes
means for calculating a target torque of said power source when said one-way clutch is in a driven state,
means for calculating a target torque of said power source when said one-way clutch is in a non-driven state, and
means for selecting the means for calculating a target torque of said power source based on a state of said one-way clutch.

12. The driving force control apparatus for the vehicle according to claim 11, wherein
said power source is an internal combustion engine, and
said means for controlling said power source and said transmission includes means for controlling a throttle opening position of said internal combustion engine.

13. A driving force control apparatus for a vehicle having a power source and a transmission connected to said power source, with a one-way clutch inserted in a powertrain including said transmission, said driving force control apparatus comprising:
means for setting a target driving force based on operation by a driver; and
means for controlling said power source based on said target driving force as set,
said means for controlling said power source and said transmission including
means for calculating a target torque of said power source when said one-way clutch is in a driven state,
means for calculating a target torque of said power source when said one-way clutch is in a non-driven state, and
means for selecting the means for calculating a target torque of said power source based on a state of said one-way clutch.

14. The driving force control apparatus according to claim 13, wherein
said power source is an internal combustion engine, and
said means for controlling said power source and said transmission includes means for controlling a throttle opening position of said internal combustion engine.

15. A driving force control method for a vehicle having a power source and a transmission connected to said power source, with a one-way clutch inserted in a powertrain including said transmission, said driving force control method comprising the steps of:
setting a target driving force based on operation by a driver;
calculating a final target driving force by adding, to said target driving force as set, transient characteristics of said target driving force, based on an operating state of said one-way clutch;
controlling said power source and said transmission based on said final target driving force as calculated; and
calculating, when said one-way clutch is in a non-driven state, a required time that is required for the non-driven state to change to a driven state,
wherein said step of calculating the final target driving force by adding, to said target driving force as set, transient characteristics of said target driving force, calculates the final target driving force by adding transient characteristics of said target driving force, based on a parameter that is set based on said required time.

16. A driving force control method for a vehicle having a power source and a transmission connected to said power source, with a one-way clutch inserted in a powertrain including said transmission, said driving force control method comprising the steps of:

setting a target driving force based on operation by a driver;

performing a first computation to calculate a target torque of said power source when said one-way clutch is in a driven state and performing a second computation to calculate a target torque of said power source when said one-way clutch is in a non-driven state, based on said target driving force as set; and controlling said power source based on the target torque as calculated.

* * * * *